United States Patent [19]

Sato et al.

[11] Patent Number: 5,275,750
[45] Date of Patent: Jan. 4, 1994

[54] METHOD OF MANUFACTURING A SOLID POLYMER ELECTROLYTE

[75] Inventors: Yoshiko Sato, Neyagawa; Hiroshi Uemachi, Osaka; Teruhisa Kanbara, Ikeda; Tadashi Sotomura, Kashihara; Kenichi Takeyama, Osaka, all of Japan

[73] Assignee: Matsushita Electric Industrial Co., Ltd., Osaka, Japan

[21] Appl. No.: 916,963

[22] Filed: Jul. 20, 1992

[30] Foreign Application Priority Data

Jul. 18, 1991 [JP] Japan .................................. 3-177996
Jul. 18, 1991 [JP] Japan .................................. 3-177998

[51] Int. Cl.$^5$ .............................................. H01G 9/02
[52] U.S. Cl. .................................... 252/62.2; 252/500; 252/518; 429/192
[58] Field of Search ....................... 252/62.2, 500, 518; 429/192, 191

[56] References Cited

U.S. PATENT DOCUMENTS 4,792,504 12/1988 Schwab et al. ..................... 252/62.2
4,798,773 1/1989 Yasukawa et al. ................... 429/192
4,908,283 3/1990 Takahashi et al. ................... 429/192
4,978,473 12/1990 Kuroda et al. ...................... 252/62.2
5,051,211 9/1991 Ward et al. .......................... 252/62.2
5,086,374 2/1992 MacFarlane et al. ............. 252/62.2

FOREIGN PATENT DOCUMENTS 2-295070 12/1990 Japan .

OTHER PUBLICATIONS

M. L. Kaplan, E. A. Reitman and R. J. Cava, "Solid Polymer Electrolytes: Attempts to Improve Conductivity", in Polymer, vol. 30, pp. 504–508 (Mar. 1989).
M. L. Kaplan, E. A. Reitman and R. J. Cava, "Crown Ether Enhancement of Ionic Conductivity in a Polymer-Sale System", in Solid State Ionics, North-Holland and Physics Publishing Division, vol. 25, pp. 37–40 (1987).

Primary Examiner—Prince Willis, Jr.
Assistant Examiner—Alan D. Diamond
Attorney, Agent, or Firm—Ratner & Prestia

[57] ABSTRACT

A method of manufacturing a solid polymer electrolyte which comprises polymerizing an ester polymethoxyoxyalkylene, a diester polyoxyalkylene, an oxycompound having a double bond, and an inorganic salt, and the solid polymer electrolyte thus obtained. The electrolyte is suitable for application in electrochemical devices such as primary or secondary battery, condenser or electrochromic display.

6 Claims, No Drawings

METHOD OF MANUFACTURING A SOLID POLYMER ELECTROLYTE

BACKGROUND OF THE INVENTION

1. Field of the Invention

This invention relates to a method of manufacturing a solid polymer electrolyte, especially one applicable for an electrochemical element such as a primary battery, secondary battery, condenser, or an electrochromic display device.

2. Prior Art

In the past, as the electrolyte for a primary battery, secondary battery, condenser, or an electrochromic display device, liquid state electrolyte has been used.

However, a liquid electrolyte is apt to cause devices in which it is involved to have leaking defects and to be of low reliability for long time usage.

On the other hand, a solid electrolyte has no such defects. With the application of the solid electrolyte, electrochemical devices as referred to above become smaller and lighter, and highly reliable without any anxiety for electrolyte leakage, and their fabrication simpler. Accordingly, research and development of solid electrolytes have been actively carried out.

The solid polymer electrolyte on which research and development has been made is divided into three materials; inorganic, organic and composite materials.

As for the inorganic material, silver iodide, $Li_2Ti_3O_7$, $\beta$-alumina, $RbAg_4I_5$, and wolfram phosphate etc. are known. However, many of them are difficult to be formed into an arbitrary shape such as a film, and, for obtaining sufficient ion-conductivity, need to be raised to a higher temperature than room temperature. Besides, raw materials therefor are expensive.

Composite materials thereof with resin, proposed to overcome such shortcomings in film-forming, involve instability of ion conduction, since the boundary between the inorganic materials is apt to be broken due to outer stress.

As materials to remedy such shortcomings described above, some organic materials have been given attention and have been the object of research.

The organic material consists of a polymer and an electrolyte, the former making a matrix and the latter working as a carrier. Since the high ion-conductivity of the material, which is a complex of polyethyleneoxide (hereinafter referred as PEO) and alkali metal salt, was reported, researches on such solid polymer electrolyte as PEO, polypropyleneoxide, polyethyleneimine, polyepichlorohydrin, or polyphosphazene have been actively carried out. Such solid polymer electrolytes of organic materials are, compared with that of inorganic materials, of light weight, of high energy-density, of good mechanical flexibility, and of suitable adaptation to film-making process. Research works to obtain solid polymer electrolytes with high ion-conductivity, while keeping such inherent favorable characteristics, are intensively carried out.

Among the ideas proposed in the past, we find one to use the above-described normal-chain polymer as a solid electrolyte, which exploits the phenomena that ions dissociated in a matrix polymer becomes, by associating with the oxygen in the polymer, a solvent, and is, by application of electric field, diffuse-transported by repeating association and dissociation. In this case, ions are transported, changing the locations of chains of polymers by thermal motion of polymers. Accordingly, polymers with low glass-transition temperature are preferrable and sufficient. However, in these normal-chain polymers, crystalization takes place under room temperature resulting in lowered ion-conductivity.

To realize high ion-conductivity in solid polymer electrolyte under room temperature, existence of an amorphous region is necessary. For that purpose, to cross-link polyoxyalkyleneglycerin with alkylenediisocyanate (Japanese patent application open laying No. Sho 63-55811) or to cross-link with tolylenediisocyanate has been proposed.

Also, a cross-link resin made by copolymerization of polyoxyalkylene having active double bonds at both ends and polymethoxyoxyalkylene having a double bond at one end has been proposed.

Thus, to obtain a high ion-conductivity electrolyte by causing a polymer matrix of polyethylene oxide structure to involve nonaqueous electrolyte containing an inorganic salt, was suggested. In such material, however, there still remained shortcoming because they were liquid.

Among oxycompounds such as ethylenecarbonate or polypropylenecarbonate, vinylenecarbonate is found to have double bond. Research to produce ion-conductive solid polymer with the polymer of vinylenecarbonate has been made since the middle of 1980s (Solid State Ionics, 25 37-40 (1987), Polymer, 30 504-508 (1989). According to the research, polyvinylenecarbonate is, by being mixed with crown ether and inorganic salt, formed to film, whose ion conductivity is $3 \times 10^{-4}$ S cm$^{-1}$.

Also, it is proposed to mix an isocyanate cross-linked complex of polyethyleneoxide, polyvinylenecarbonate or poly$\beta$-propiolactone, and inorganic salt, and cast into film-form (Japanese patent application open-laying No, Hei 2-295070). With the isocyanate as used for conventional methods being highly reactive, it is difficult to realize a reproducible cross-linked state, unless water content and activity of isocyanate itself are controlled at the preparation stage. Also, when the urethane cross-linked complex is used in a battery, active hydrogen atoms in urethane bond are decomposed and cut off, resulting in instability of the electrolyte.

Also, copolymers of the compounds having reactive double bonding had the difficulty in obtaining high ion-conductivity due to restriction of motion of an oxyalkylene chain by the polymerized main chain.

Further, these solid-state polyethyleneoxides, poorly dissolving inorganic salts, and not attaining sufficient numbers of dissociated ions, could not realize high ion-conductivity.

SUMMARY OF THE INVENTION

It is an object of the present invention to solve the above-described problems and to provide a method to obtain a solid polymer electrolyte, which has high ion-conductivity and is stable at room temperature, and which is easily manufactured.

To attain the above described object the method of manufacturing a solid polymer electrolyte according to the present invention comprises to copolymerizing an ester compound, diester compound and oxycompound to form a cross-linked resin in the presence of inorganic salt, wherein the said ester compound is at least one selected from polymethoxyoxyalkylenes represented by general formula;

$$\underset{\underset{O}{\|}}{H_2C=\overset{R_1}{\underset{|}{C}}-C-(OCHCH_2)_n-OCH_3}$$

where
R$_1$; H, CH$_3$
R$_2$; H, CH$_3$, C$_2$H$_5$
n; 1 to 30
the said diester compound is at least one selected from polyoxyalkylenes represented by general formula;

$$H_2C=\overset{R_1}{\underset{|}{C}}-\underset{\underset{O}{\|}}{C}-(OCHCH_2)_n-O-\underset{\underset{O}{\|}}{C}-\overset{R_2}{\underset{|}{C}}=CH_2$$

where
R$_1$; H, CH$_3$
R$_2$; H, CH$_3$, C$_2$H$_5$
n; 1 to 30, and
the said oxycompound has a double bond.

Also, according to the invention, the solid polymer electrolyte is manufactured by polymerizing an ester polymethoxyoxyalkylene and a diester polyoxyalkylene, forming a film of cross-linked resin, and causing the film of the cross-linked resin to absorb an oxycompound having a double bond and containing an inorganic salt and to copolymerize.

In the solid polymer electrolyte manufacturing method according to the invention, an ester compound of polymethoxyoxyalkylene, diester compound of polyoxyalkylene, and an oxycompound with a double bonds which form the main constituent thereof, have their double bond radically polymerized by ultraviolet radiation without any by-product, to produce a chemically stable cross-linked resin.

An oxycompound with a double bond dissolves inorganic salt with a high degree of dissociation and has its ion conduction improved, and, by being cross-linked by copolymerization, it is possible to realize complete solid.

Further, the solid polymer electrolyte of the invention does not involve active hydrogen in the electrolyte molecules thereof. Accordingly, if it is contained in an electrochemical element, such as a battery, it does not suffer, by electrochemical reaction, any decomposition, cutting off, or such deterioration. Thus, it is suitable for use as an electrolyte of primary batteries, secondary batteries, condensers, electrochromic display elements, or such various electrochemical elements.

As for polyoxyalkylene chain, by making random copolymers from more than two monomers selected from oxyethylene, oxypropylene and 2-oxybutylene, partial crystallization is prevented and ion conductivity at low temperature is improved.

EMBODIMENT

In the following, embodiments of the present inventions will be described in detail.

EMBODIMENT 1

Ten grams of ester polyoxyethylenedimethacrylate $$CH_2=\overset{CH_3}{\underset{|}{C}}-\underset{\underset{O}{\|}}{C}-O-(CH_2CH_2O)_9-\overset{CH_3}{\underset{|}{C}}=CH_2$$

(number of oxyethylene unit: 9, molecular weight: 536, product of Shin-Nakamura Kagaku Kogyo), 30 g of ester polymethoxyoxyethylene methacrylate $$CH_3-O-(CH_2CH_2O)_9-\underset{\underset{O}{\|}}{\overset{CH_3}{\underset{|}{C}}}-C=CH_2$$

(number of oxyethylene unit: 9, molecular weight 468, product of Shin-Nakamura Kagaku Kogyo), 40 g of vinylenecarbonate, $$\begin{array}{c}HC=CH\\|\quad\quad|\\O\quad\;O\\\diagdown\diagup\\C\\\|\\O\end{array}$$

and 4 g of LiClO$_4$ were mixed. The mixture was, after addition of 0.2 g of benzyldimethyleketal,

[structure of benzyldimethylketal with two phenyl groups attached to central C-C with OCH$_3$ groups]

a photo-activator, casted on a titanium foil, and were irradiated with ultraviolet rays to cause polymerization, to form a film of cross-linked resin, the whole process being made in an atmosphere of inactive argon.

From the film thus obtained (30 μm thick), discs of 13 mm diameter were stamped out, and on another surfaces thereof, a titanium foils of 13 mm diameter were affixed.

Of the discs the impedance was measured over 1 Hz to 1 MHz with an impedance analyzer and complex impedance analysis at 25° C. and the ion-conductivity was found 1×10$^{-3}$S cm$^{-1}$.

EMBODIMENT 2

Ten grams of ester polyoxypropylenediacrylate $$CH_2=CH-\underset{\underset{O}{\|}}{C}-(CH_2\overset{CH_3}{\underset{|}{C}}HO)_{23}-\underset{\underset{O}{\|}}{C}-CH=CH_2$$

(number of oxyethylene unit; 23, molecular weight; 1136, product of Shin-Nakamura Kagaku Kogyo), 40 g of ester polymethoxyoxyethylenemethacrylate (number of oxyethylene unit; 23, molecular weight; 1068, product of Shin-Nakamura Kagaku Kogyo), 40 g of vinylenecarbonate, and 4 g of LiClO$_4$ were mixed. The mixture was, after addition of 0.2 g of benzyldimethyleketal, a photo-activator, casted on a titanium foil, and was provided with ultraviolet radiation to result in polymerization, to form a film of liquid resin, the process being made in argon atmosphere.

From the film thus obtained (30 μm thick), discs of 13 mm diameter were stamped out, and on another surfaces thereof a titanium foils of 13 mm diameter were affixed.

Of the discs, the impedance was measured over 1 Hz to 1 MHz with an impedance analyzer at 25° C. and the ion conductivity was found $9 \times 10^{-3}$ S cm$^{-1}$.

EMBODIMENT 3

Ten grams of ester polyoxypropylenediacrylate (number of oxypropylene unit; 12, molecular weight; 808, product of Shin-Nakamura Kagaku Kogyo), 40 g of ester polymethoxyoxyethylenemethacrylate (number of oxyethylene unit; 23, molecular weight; 1068, product of Shin-Nakamura Kagaku Kogyo), 40 g of vinylenecarbonate and 4 g of LiClO$_4$ were mixed. The mixture, then, with addition of 0.2 g of benzyldimethyleketal, a photo-activator, casted on a titanium foil, and were provided with ultraviolet radiation to result in polymerization, to form a film of cross-linked resin, the process being made in argon atmosphere.

From the film thus obtained (30 μm thick), discs of 13 mm diameter were stamped out, and on another surfaces thereof a titanium foil of 13 mm diameter were affixed.

Of the discs, the impedance was measured over 1 Hz to 1 MHz with an impedance analyzer at 25° C., and the ion conductivity was found $5 \times 10^{-3}$ S cm$^{-1}$.

EMBODIMENT 4

Ten grams of ester polyoxyethylenedimethacrylate (number of oxyethylene unit; 9, molecular weight; 536, product of Shin-Nakamura Kagaku Kogyo), and 30 g of ester polymethoxyoxyethylenemethacrylate (number of oxyethylene unit; 9, molecular weight; 468, product of Shin-Nakamura Kagaku Kogyo) were mixed and the mixture was, after addition of 0.1 g of benzyldimethyleketal, a photo-activator, casted on a titanium foil to form a film of cross-linked resin, and were provided with ultraviolet radiation to result in polymerization.

Forty grams of vinylenecarbonate, after addition of 4 g of LiClO$_4$ and 0.1 g of benzyldimethyleketal, to be dissolved therein, was caused to be absorbed into the films and the films were radiated with ultraviolet radiation to have polymerization of vinylenecarbonate. The processes were made in an argon atmosphere. From the film thus obtained (30 μm thick), discs of 13 mm diameter were stamped out, and on another surfaces thereof a titanium foil of 13 mm diameter were affixed.

Of the discs, the impedance was measured over 1 Hz to 1 MHz with an impedance analyzer at 25° C., and the ion conductivity was found $3 \times 10^{-3}$ S cm$^{-1}$.

EMBODIMENT 5

Ten grams of ester polyoxyethylenedimethacrylate (number of oxyethylene unit; 23, molecular weight; 1136, product of Shin-Nakamura Kagaku Kogyo) and 40 g of ester polymethoxyoxyethylenemethacrylate (number of oxyethylene unit; 23, molecular weight; 1068, product of Shin-Nakamura Kagaku Kogyo) were mixed and, after addition of benzyldimethyleketal, a photo-activator, were casted on a titanium foil, to form a film of cross-linked resin, and were provided with ultraviolet radiation to result in polymerization.

Forty grams of vinylenecarbonate, with addition of 4 g of LiClO$_4$ and 0.1 g of benzylmethyleketal dissolved therein, was caused to be absorbed in the films, and the films were radiated with ultraviolet radiation to make the vinylencarbonate polymerize. From the film thus obtained (30 μm thick), discs of 13 mm diameter were stamped out, and, on another surfaces titanium foils of 13 mm diameter were affixed.

Of the discs, the impedance was measured over 1 Hz to 1 MHz with an impedance analyzer at 25° C., and the ion conductivity was found $4 \times 10^{-3}$ S cm$^{-1}$.

EMBODIMENT 6

Ten grams of ester polyoxypropylenediacrylate (number of oxypropylene unit; 12, molecular weight; 808, product of Shin-Nakamura Kagaku Kogyo) and 40 g of ester polymethoxyoxyethylenemethacrylate (number of oxyethylene unit; 23, molecular weight; 1068, product of Shin-Nakamura Kagaku Kogyo) were mixed with 0.1 g of benzyldimethyleketal, a photo-activator, to be dissolved therein, and the mixture was casted on a titanium foil to form a film of cross-linked resin, and was given ultraviolet radiation to result in polymerization.

Forty grams of vinylenecarbonate, with addition of 4 g of LiClO$_4$ and 0.1 g of benzylmethyleketal dissolved therein, was caused to be absorbed in the film and the film was radiated with ultraviolet radiation to make the vinylecarbonate polymerize.

From the film thus obtained (30 μm thick), discs of 13 mm diameter were stamped out and on the another surface, titanium foils of 13 mm diameter were affixed.

Of the discs, the impedance was measured with an impedance analyzer over 1 Hz to 1 MHz at 25° C., and the ion conductivity was found $2 \times 10^{-3}$ S cm$^{-1}$.

COMPARISON 1

Ten grams of ester polyoxyethylenedimethacrylate (number of oxyethylene unit; 9, molecular weight; 536, product of Shin-Nakamura Kagaku Kogyo), 30 g of ester polymethoxyoxyethylenemethacrylate (number of oxyethylene unit; 9, molecular weight; 468, product of Shin-Nakamura Kagaku Kogyo) and 4 g of LiClO$_4$ were mixed, and, with addition of 0.2 g of benzyldimethyleketal, were casted on a titanium foil, to form a film of cross-linked resin, and provided with ultraviolet radiation, to result in polymerization, the process being carried out in an argon atmosphere. From the film thus obtained (30 μm thick), discs of 13 mm diameter were stamped out, and on another surfaces thereof titanium foils of 13 mm diameter were affixed. Of the discs, the impedance was measured over 1 Hz to 1 MHz with an impedance analyzer at 25° C. and the ion conductivity was found $1 \times 10^{-5}$ S cm$^{-1}$.

COMPARISON 2

Ten grams of ester polyoxyethylenedimethacrylate (number of oxyethylene units; 23, molecular weight; 1136, product of Shin-Nakamura Kagaku Kogyo), 40 g of ester polymethoxyoxyethylenemethacrylate (number of oxyethylene units; 23, molecular weight; 1068, product of Shin-Nakamura Kagaku Kogyo), and 4 g of LiClO$_4$ were mixed, and, with addition of 0.1 g of benzyldimethyleketal, casted on a titanium foil, to form a film of cross-linked resin, and provided with ultraviolet radiation to result in polymerization. From the film thus obtained (30 μm thick), discs of 13 mm diameter were stamped out, and on another surfaces thereof titanium foils of 13 mm diameter were affixed. Of the discs, the impedance was measured over 1 Hz to 1 MHz with an impedance analyzer at 25° C. and the ion-conductivity was found $1 \times 10^{-5}$ S cm$^{-1}$.

COMPARISON 3

Ten grams of ester polyoxypropylenediacrylate (number of oxypropylene unit; 12, molecular weight; 808, product of Shin-Nakamura Kagaku Kogyo), 40 g of ester polymethoxyoxyethylenemethacrylate (number of oxyethylene unit; 23, molecular weight; 1068, product of Shin-Nakamura Kagaku Kogyo), and 4 g of LiClO$_4$ were mixed, and, with addition of 0.1 g of benzyldimethyleketal dissolved therein, were, casted on a titanium foil, to form a film of cross-linked resin, and provided with ultraviolet radiation to result in polymerization.

From the film thus obtained (30 μm thick), discs of 13 mm diameter were stamped out, and on another surfaces thereof titanium foils of 13 mm diameter were affixed. Of the discs, the impedance was measured over 1 Hz to 1 MHz with an impedance analyzer at 25° C. and the ion-conductivity was found $1.5 \times 10^{-5}$ S cm$^{-1}$.

As is clear from the above explanation of the embodiments, according to the present invention, by causing a cross-linked resin having polyoxyalkylene as its main frame to polymerize with vinylenecarbonate, a solid polymer electrolyte having high ion-conductivity results and is suitable as the solid polymer electrolyte for an electrochemical device such as a primary battery, secondary battery, condenser, or electrochromic display.

We claim:

1. A method of manufacturing a solid polymer electrolyte comprising polymerizing an ester compound, a diester compound and vinylenecarbonate in the presence of inorganic salt to form a cross-linked resin, wherein said ester compound is at least one selected from polymethoxyoxyalkylenes represented by the general formula:

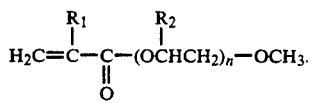

where
R$_1$ is H, CH$_3$
R$_2$ is H, CH$_3$, C$_2$H$_5$
n is 1 to 30,
said diester compound is at least one selected from polyoxyalkylenes represented by the general formula:

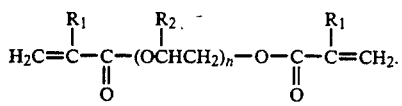

where
R$_1$ is H, CH$_3$
R$_2$ is H, CH$_3$, C$_2$H$_5$
n is 1 to 30.

2. A method of manufacturing a solid polymer electrolyte comprising the steps of:
copolymerizing an ester compound and a diester compound to form a cross-linked resin,
absorbing into the cross-linked resin, an inorganic salt and an oxycompound having a double bond, and then copolymerizing again,
wherein said ester compound is at least one selected from polymethoxyoxyalkylenes represented by the general formula:

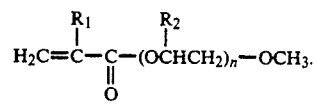

where
R$_1$ is H, CH$_3$
R$_2$ is H, CH$_3$, C$_2$H$_5$
n is 1 to 30,
and said diester compound is at least one selected from polyoxyalkylenes represented by the general formula:

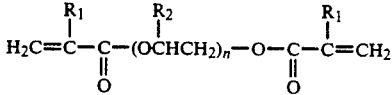

where
R$_1$ is H, CH$_3$
R$_2$ is H, CH$_3$, C$_2$H$_5$
n is 1 to 30.

3. The method of manufacturing a solid polymer electrolyte according to claim 2, wherein said oxycompound having a double bond is vinylenecarbonate represented by the structural formula;

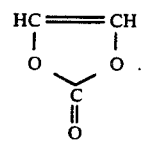

4. The solid polymer electrolyte obtained from the method according to claim 1.

5. The solid polymer electrolyte obtained from the method according to claim 2.

6. The solid polymer electrolyte obtained from the method according to claim 3.

* * * * *